United States Patent [19]

Graton et al.

[11] Patent Number: 5,013,281

[45] Date of Patent: May 7, 1991

[54] MONOBLOC HUB, PARTICULARLY FOR AN AUTOMOTIVE VEHICLE

[75] Inventors: Michel Graton, Paris; Richard Lewandowski, Rubempre, both of France

[73] Assignee: Valeo, Paris, France

[21] Appl. No.: 408,194

[22] Filed: Sep. 15, 1989

[30] Foreign Application Priority Data

Sep. 16, 1988 [FR] France .................. 88 12090

[51] Int. Cl.$^5$ .............................. F16D 3/66
[52] U.S. Cl. ....................... 464/68; 192/106.2
[58] Field of Search .................. 464/68, 67; 29/159.3, 29/DIG. 18, 34 R; 192/106.2

[56] References Cited

U.S. PATENT DOCUMENTS

| | | | |
|---|---|---|---|
| 1,190,049 | 7/1916 | Ullensaker | 464/67 |
| 1,324,890 | 12/1919 | Glenn | 464/67 |
| 1,830,746 | 11/1931 | Ahlene et al. | 192/106.2 |
| 3,101,600 | 8/1963 | Stromberg | 192/106.2 X |
| 3,523,442 | 8/1970 | Marciniak | 72/406 |
| 4,088,212 | 5/1978 | Brown | 192/106.2 |
| 4,190,142 | 2/1980 | Berlioux | 192/106.2 |
| 4,471,863 | 9/1984 | Lech | 192/106.2 |
| 4,548,302 | 10/1985 | Lech et al. | 192/106.2 |
| 4,651,548 | 3/1987 | Bernet | 72/71 |

FOREIGN PATENT DOCUMENTS

| | | | |
|---|---|---|---|
| 1559067 | 1/1969 | France . | |
| 1560475 | 2/1969 | France . | |
| 2183389 | 12/1973 | France . | |
| 2363731 | 3/1978 | France . | |
| 0093521 | 5/1984 | Japan | 192/106.2 |
| 812001 | 4/1959 | United Kingdom . | |

Primary Examiner—Rodney H. Bonck
Attorney, Agent, or Firm—Charles A. Brown

[57] ABSTRACT

In a monobloc hub of the kind having an integral hub plate formed with openings at or towards its outer periphery, the hub is also provided with a number of projections. Some of the opening are adapted to receive circumferentially acting resilient springs. The hub is preferably that of a torsion damper, particularly for a friction clutch for an automotive vehicle. The hub is formed in one piece by orbital forging. The various projections provide a local increase in the thickness of the hub plate, wherever required and especially in the region of the various peripheral openings in the hub plate.

2 Claims, 3 Drawing Sheets

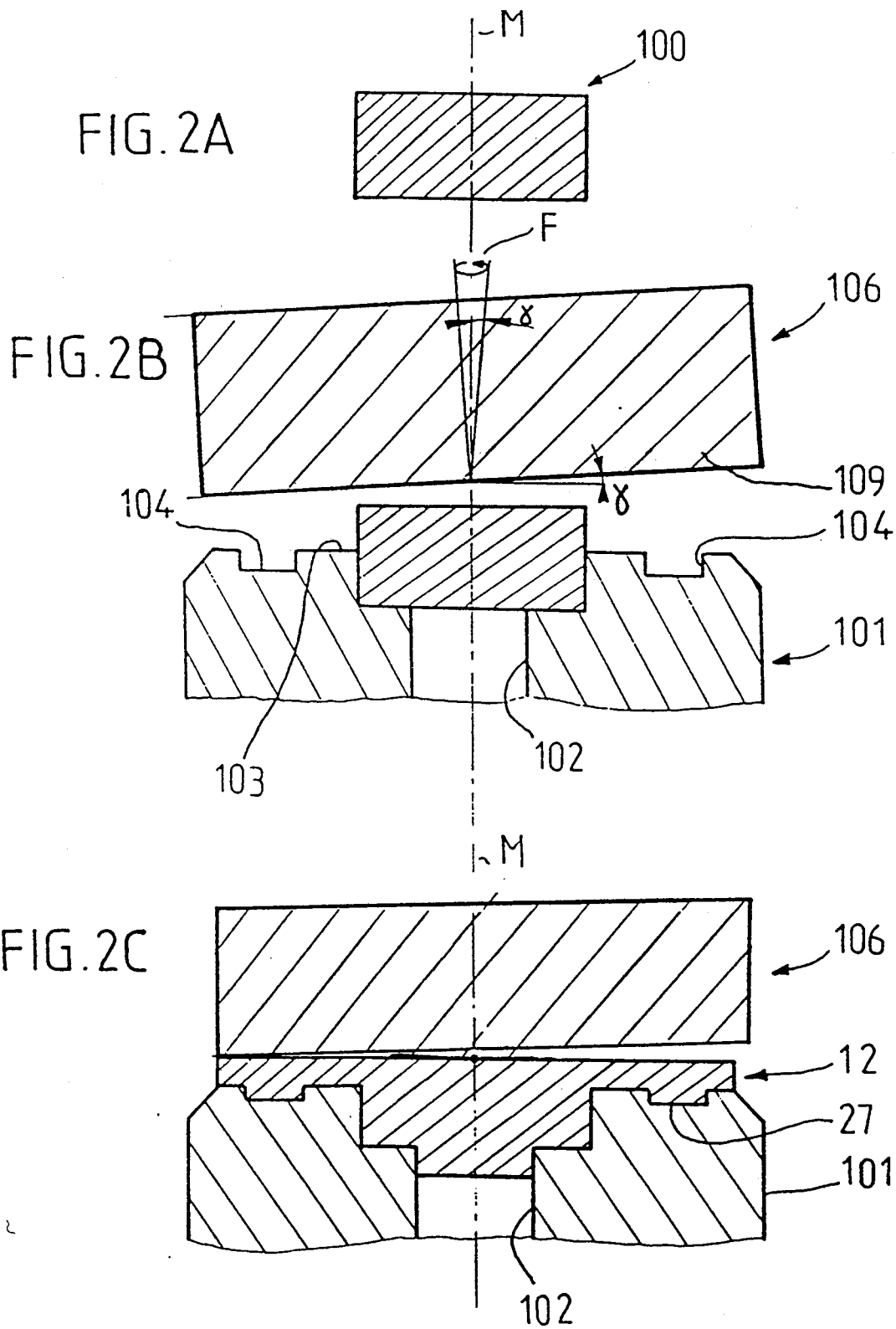

MONOBLOC HUB, PARTICULARLY FOR AN AUTOMOTIVE VEHICLE

FIELD OF THE INVENTION

This invention relates to monobloc hubs, of the kind having a transversely extending hub plate provided with projections and, at its outer periphery, a plurality of openings, some of which are adapted to receive circumferentially acting resilient means for a torsion damper, particularly for a friction clutch for an automotive vehicle.

BACKGROUND OF THE INVENTION

A hub of the kind described above is disclosed in U.S. Pat. No. 4,088,212 and the corresponding French published patent application No. FR-2 363 731 A, in which the hub with its projections is obtained by pressing from sheet metal. The projections are disposed at the inner periphery of the hub plate, for the purpose of centring components of the torsion damper. The major disadvantage of this arrangement resides in the fact that the hub plate has a thickness the value of which is least in the region of the projections, and the fibres of the metal are broken up at this point. For this reason, the mechanical strength of the component is not as great as is desirable.

In addition, it is not possible to form protuberances in every location where they might be required, since their shape is influenced by the presssing operation and is dependent on the thickness of the hub plate.

In general terms, it is desirable to improve the mechanical integrity of the hub plate. One proposal for achieving this is disclosed in United Kingdom patent specification No. 812001, and comprises thickening the inner periphery of the hub plate to the detriment of the axial space available between the hub plate and the guide rings of the torsion damper.

Another proposal, described in U.S. Pat. No. 4,190,142, consists in splitting the monobloc hub into two, which inevitably leads to an increase in the radial bulk of the torsion damper.

SUMMARY OF THE INVENTION

An object of the present invention is to overcome these disadvantages and to provide a monobloc hub that has the projections but which also has increased mechanical strength, while also obtaining further advantages.

According to the present invention, the monobloc hub comprises a single forged member which includes a hub plate, the latter being formed with projections so that they locally increase its thickness and constitute reinforcements in the vicinity of the peripheral openings of the hub plate.

The invention enables the service life of the damper, as well as its general robustness, to be increased without adding to the radial bulk of the damper, while also leaving space available in the region of the inner periphery of the hub plate. It will also be appreciated that the thickness of the hub plate is not reduced, and that it may accordingly have a constant thickness except at the projection themselves. This facilitates a reduction in the inertia of the hub. It will also be appreciated that the reinforcements can be provided in the more fragile zones of the component.

According to a preferred feature of the invention, the monobloc hub is characterised in that it is obtained from a metal blank by a process in which: the blank is placed in a lower tool member comprising a die, the die being provided with a central, bank-receiving aperture for receiving the blank, and also being provided on its upper face with at least one lateral recess, then, with the assistance of an oscillating punch, the metal of the said blank is cause to flow under pressure so as to fill the lateral recess or recesses, in such a way that the hub is obtained by plastic deformation of the blank.

It will be appreciated that the fibres of the metal are not broken, and that the metal, during the plastic flow that takes place, fills the recess of recesses of the die without reducing the thickness of the hub plate. In addition, the hardness of the hub plate is greater than that of the initial blank, since the metal is cold-worked during the plastic flow. In addition, the shape of the projections, and also their exact location, is determined by the shape and positioning of the recesses in the tooling. It wil also be noted that the central portion of the hub can be provide with an increased thickness at its junction with the hub plate.

In addition, further possibilities are offered, for example the fact that reinforcement can be provided in any otherwise fragile zone of the component. An example of such a zone is any zone in which there is some risk of fracture under very high torque. It also becomes possible to increase the thickness of the openings which are provided therein for accommodating resilient means such as damping springs, in such a way that fretting corrosion of these springs is reduced. The method according to the invention permits a large choice of materials for manufacture of the hub, without the need to carry out any supplement operations.

The description which follows illustrates the invention in the context of a friction clutch for an automotive vehicle, and is given with reference to the accompanying drawings.

BRIEF DESCRIPTION OF THE DRAWINGS

FIGS. 2A to 2C are diagrammatic views illustrating different stages of the method of manufacture.

DESCRIPTION OF PREFERRED EMBODIMENTS OF THE INVENTION

Figure 1:
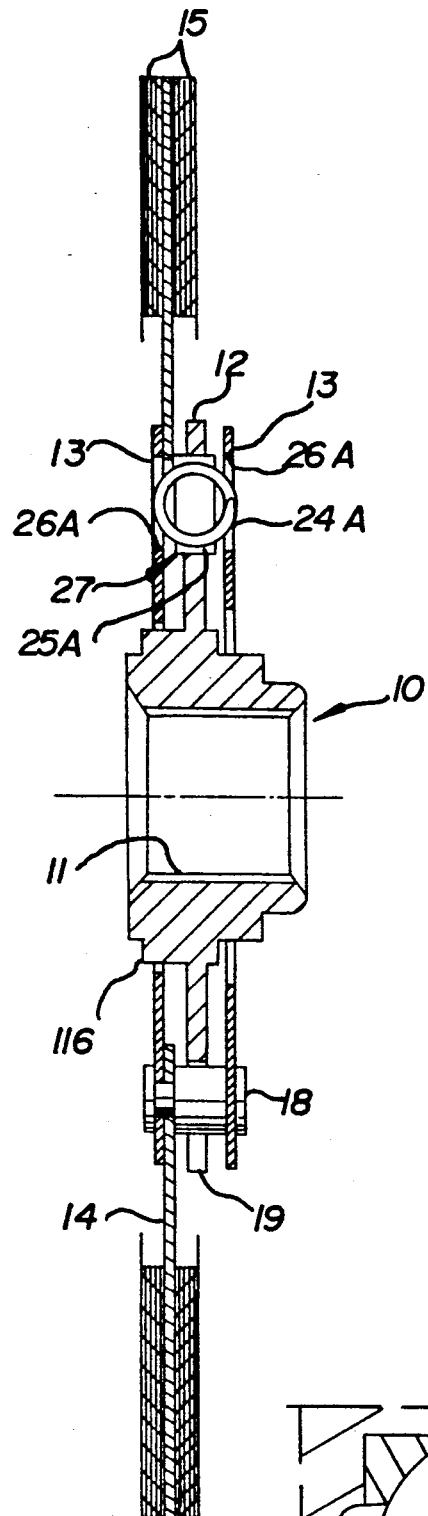
FIG. 1 is a view in axial cross section of a friction clutch according to the invention.

FIG. 1 shows at 10 the monobloc hub according to the invention, with its integral, transverse, wheel portion or hub plate at 12. The latter is provided with openings at its outer periphery comprising windows 25A and slots 19, which will be described below. The hub 10 is arranged to be mounted by means of splines 11 on the input shaft of the gearbox of an automotive vehicle, the input shaft being appropriately splined for this purpose for meshing with the splines 11. Circumferentially acting resilient means 24A couple the hub to one part of the damper comprising two guide rings 13. The latter are secured to each other through spacer members 18 which pass through the slots 19 in the hub plate 12. The spacers 18 also serve to secure a disc 14 which carries the friction pads 15. In this example the hub plate 12 is much thicker than the rings 13. The guide rings 13 are adapted to be coupled for rotation with the engine shaft of the vehicle through gripping of the friction pads 15 between the pressure plate and reaction plate (not shown) of the clutch.

The friction clutch thus comprises two coaxial parts, movable with respect to each other against the action of the resilient means 24A. In this example, the latter consist of coil springs which are partly mounted without clearance in the windows 25A of the hub plate 12, and partly, with a facility for a clearance, within further windows 26A formed in the guide rings 13. The windows 26A are arranged generally in register with the windows 25A.

In accordance with this invention, the monobloc hub 10 is in the form of a moulded body. Its integral hub plate 12 is provided with projections 27, 112, 113, and 114, which locally increase its thickness so as to form reinforcements in the region of the peripheral openings 19 and 25A of the hub plate 12. In FIG. 1, the hub plate 12 also has further projections 27 extending axially and constituting reinforcements, which surround the windows 25A and which are located on the edge of the latter, in such a way that the thickness of the hub plate 12 is increased locally. The surface area on which the springs 24 engage is thus increased. It also becomes possible to mount a further spring inside each of the springs 24A.

In accordance with a preferred feature of the invention, the method of manufacture of the monobloc hub 10, with its hub plate 12 and its various projections, is characterised as follows. Referring to FIG. 2, a metal blank 100, FIG. 2A, is mounted in a lower matrix tool member comprising a die 101, FIG. 2B. The die 101 has a central, blank-receiving aperture 102 in which the blank 100 lies, while on the upper face 103 of the die at least one further recess 104, 105 (see FIG. 3) is formed. An upper tool member in the form of a punch 106 is placed over the die 101. The metal of the blank 100 is then caused to flow, with the aid of the punch 106 which is in oscillating motion. This is carried out in such a way that the recess 104, is filled with metal from the blank 100, the hub 10 accordingly being formed by plastic deformation. The blank 100 is thus reformed by a forging process, and the operation is quite quiet, since the material is displaced by pressure and not by impact. It will be noted that, since this is a cold forming process, the hub plate 12 becomes hardened, for example in the region of the reinforcing projection 27 which is seen in FIG. 1. This method of manufacture is called orbital forging.

Figure 6:
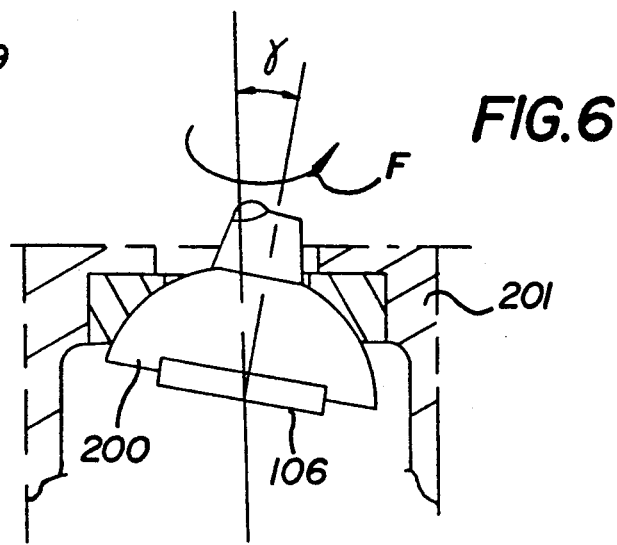
FIG. 6 is a simplified view of the upper part of the tooling used to make the hub, showing its movements.

In this example, two press tools are used, namely the lower tool or die 101, which is fixed and closed in the bed of the press, and the upper tool or punch 106. Referring to FIG. 6, this shows the punch 106 carried by a tool head indicated by the reference numeral 200. The latter is mounted in a fixed head 201. The axis of the upper tool head 200 is inclined to the vertical by a small angle γ, as will be described in greater detail below. Although the orbital forging operation is carried out cold, electric heating may if required be applied by the provision of suitable supplementary equipment for this purpose. This method of manufacture also enables the hub plate 12 to be provided with projections at its inner periphery.

Thus, and referring again to FIG. 2, a recess 104 is provided for the formation of a projection 110, described below, the purpose of which is to drive friction rings of the torsion damper.

Figure 3:
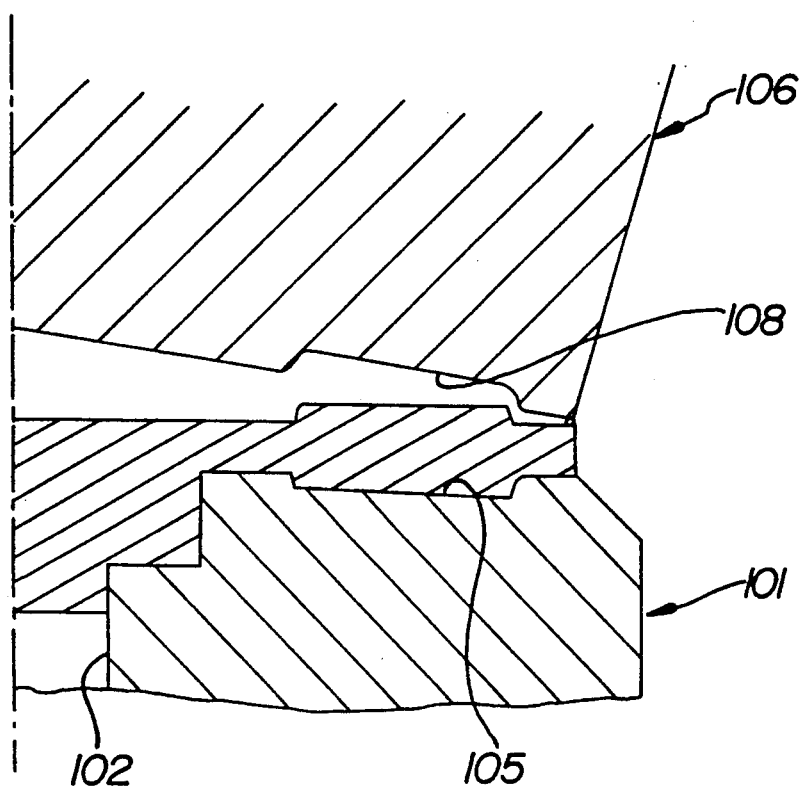
FIG. 3 is a view similar to FIG. 2C showing how aperture reinforcements are made.

Referring now to FIG. 3, the recess 105 is provided for the purpose of forming projections 27 which constitute reinforcements in the region of the windows 25A. The oscillating punch 106 is in this example annular in shape, and, as seen in FIG. 3, it too is provided with recesses 108. This arrangement enables the projections 27 to be able to extend from either side of the hub plate 12, so as to increase the surface area against which the springs 24A can engage.

As can be seen from FIGS. 2 and 3, the lower face 109 of the punch 106 is slightly inclined by the above mentioned angle γ with respect to the vertical central axis of the press, indicated in the centre of FIG. 2B. This angle varies from 1 minute to 2 degrees in swing and counter swing. With respect to the median axis MM in FIG. 2, the angle made between the axis of symmetry of the punch 106 and the median axis thus varies by the angle γ on either side of the median axis. In FIG. 2B, the extreme positions of the axis of rotational and oscillating symmetry of the punch 106 are indicated. The direction of rotation is indicated by the arrow F (see also FIG. 6). Flow of the metal of the blank 100 is of course induced by the forces exerted on the blank between the upper tool head 200 and the punch 106 oscillating with it on the one hand, and the die 101 cooperating with it on the other. Also, as will already have been understood, the shape of the projections formed on the hub is determined by the shape of the various recesses 104, 105, 108, of which there may be any required number.

Figure 4:
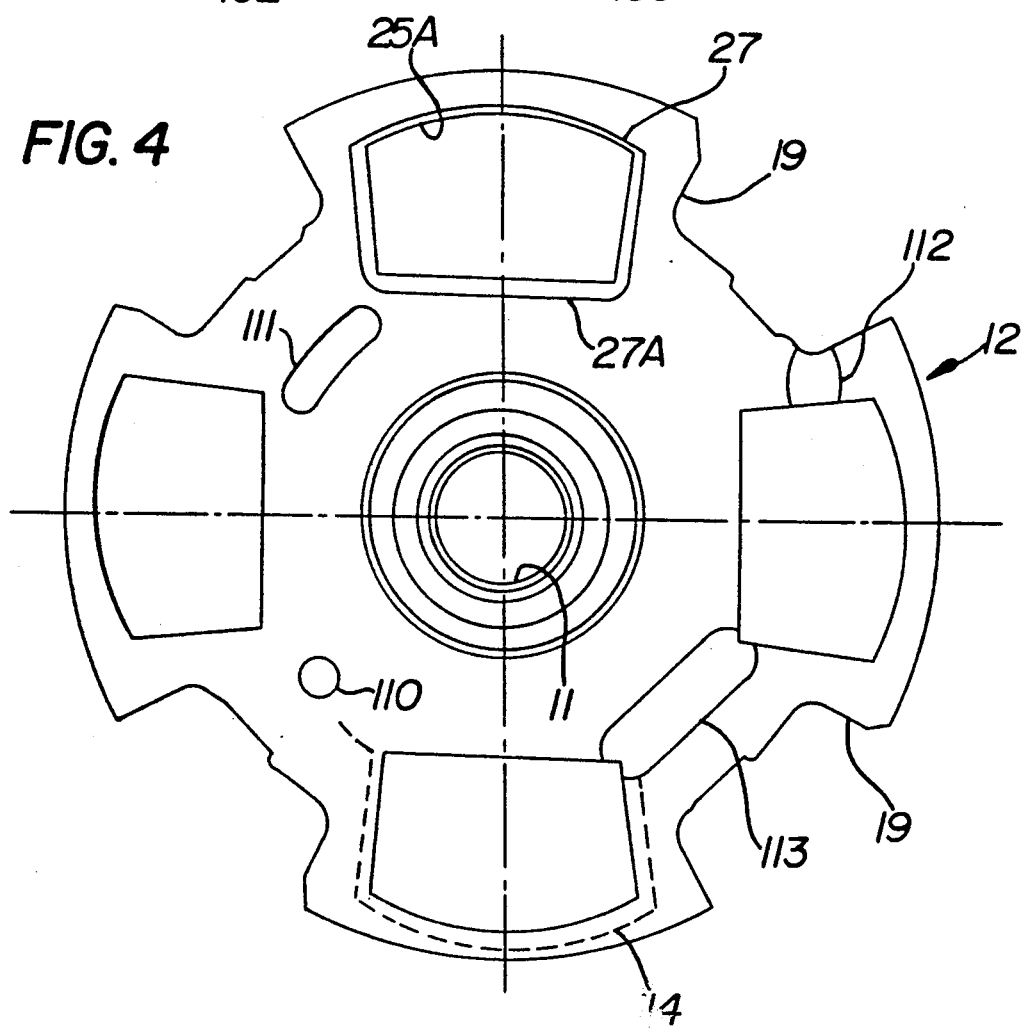
FIG. 4 is a front view of the monobloc hub with different forms of projections.

FIG. 4 shows various different forms of axially orientated projections, for example a projection indicated at 110 which is of the same kind as that described in the above mentioned French published patent application No. FR-2 363 731 A.

As will appear from this description, it is possible, due to the recesses formed in the die 101 and/or in the punch 106, to obtain a projection of oblong form, such as is indicated at 111 in FIG. 4. This would have been impossible hitherto, particularly when the hub plate was thickened and then subjected to a supplementary turning operation. This is because increased resistance is thus set up.

The windows 25A may of course be cut out subsequently, i.e. after the formation of the reinforcements 27 seen in FIG. 1. The same is true of the splines 11, which are obtained by drilling followed by a final broaching operation. It will be appreciated that manufacture of the hub by a forging process enables the hardness of its central portion to be kept within required limits, i.e. undue hardening is avoided.

The invention offers a number of new possibilities. For example, the reinforcements may be inserted into otherwise fragile zones. One example of this (referring to FIG. 4) is laterally as shown at 112. Another example has reinforcements extending between the edges of the slots 19 and the lateral edges of the windows 25A, along the edges of the windows 25A and the slots 19. This arrangement enables the length of a slot 19 to be increased without reducing the mechanical strength of the hub plate 12. The relative angular displacement between the hub 10 and the guide ring 13 can be increased. The same is true for the windows 25A, which may be made larger circumferentially than previously, in order to increase this displacement. The reinforcements can also be provided in one of the lower corners of a window 25A, and may connect between them two corners of consecutive windows, as can be seen at 113 in FIG. 4.

It will be clear from the above description that, where the grain or crystal structure of the blank 100 is initially concentric, it remains so after the plastic flow during forging. It will also be appreciated that the zone connecting the hub plate 12 to the hub 10 itself can be made relatively thick. This can be seen at 116 in FIG. 1, and is such that the mechanical strength of the resulting member 10, 12 is increased still further. The shape of the reinforcement 116 is determined by that of the central aperture 102 in the lower die 101.

The present invention is of course not limited to the embodiments described. For example, the projections may be made to extend only on one side of the hub plate 12, with the recesses 108 being omitted in this case from the punch. The reinforcements 27 may extend only on one side of the hub plate 12, with the other side being provided with a projection 110 (FIG. 4). The windows, or housing openings, 25A for the springs 24A may be open at least partially on their outer radial side, while the slots 19 may be made closed on their outer radial side. The slots 19 may of course be surrounded by reinforcements, which as mentioned above increase the area of contact of the spacer bars 18 with the slots 19.

Figure 5:
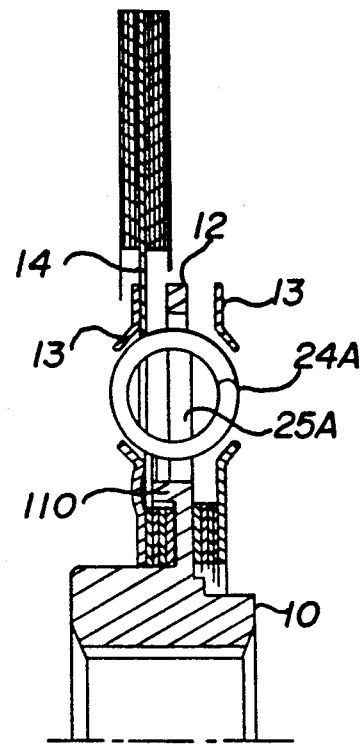
FIG. 5 is a view similar to FIG. 1, showing a modification.

FIG. 5 shows the application of the invention to a friction disc of the kind described in FIG. 8 of French published patent application No. FR-2 183 389 A. The projection 110 allows the friction rings of the assembly to be driven. A large number of combinations is thus made possible.

The guide rings 13 may be fixed directly on the reaction plate of the clutch. The damper itself may form part of a double damped flywheel.

Again, it is possible to associate a reinforcement which connects two consecutive windows together, for example as indicated at 113 in FIG. 4, with another reinforcement which surrounds the window 25A. In this case the lower portion 27A of the reinforcement 27 may be omitted in order to obtain a projecting rim which surrounds the various windows and connects them together, as can be seen partially in broken lines at 114 in FIG. 4.

Other kinds of movement of the upper tool head 200 with its punch 106 are of course possible, for example a planetary spiral movement or movement in straight lines. The type of movement will be chosen according to the application and according to the shapes which it is desired to obtain. In all cases, the product obtained can be made with considerable accuracy.

What is claimed is:

1. A monobloc hub comprising a transversely extending hub plate, said hub plate having a plurality of projections, said hub plate further having at its outer periphery a plurality of openings, some of said openings being adapted to receive circumferentially acting resilient means, said projections representing local thickening of said hub plate and constituting reinforcement in the region of said peripheral openings of said hub plate, some of the openings formed in the hub plate comprising slots to accommodate, extending therethrough, spacer bars connecting together two guide rings of a torsion damper, and wherein said slots have at least some of said projections being arranged along their edges.

2. A monobloc hub comprising a transversely extending hub plate, said hub plate having a plurality of projections, said hub plate further having at its outer periphery a plurality of openings, some of said openings being adapted to receive circumferentially acting resilient means, said projections representing local thickening of said hub plate and constituting reinforcement in the region of said peripheral openings of said hub plate, said openings comprising housing openings for accommodating said resilient means together with slots for accommodating spacer bars extending therethrough and connecting together two guide rings of a torsion damper, and wherein said reinforcing projections connect one of said housing openings with one of said slots.

* * * * *